Feb. 7, 1956   C. J. SIEGEL   2,733,532
ICE FISH POLE AND TIP OVER
Filed July 26, 1954
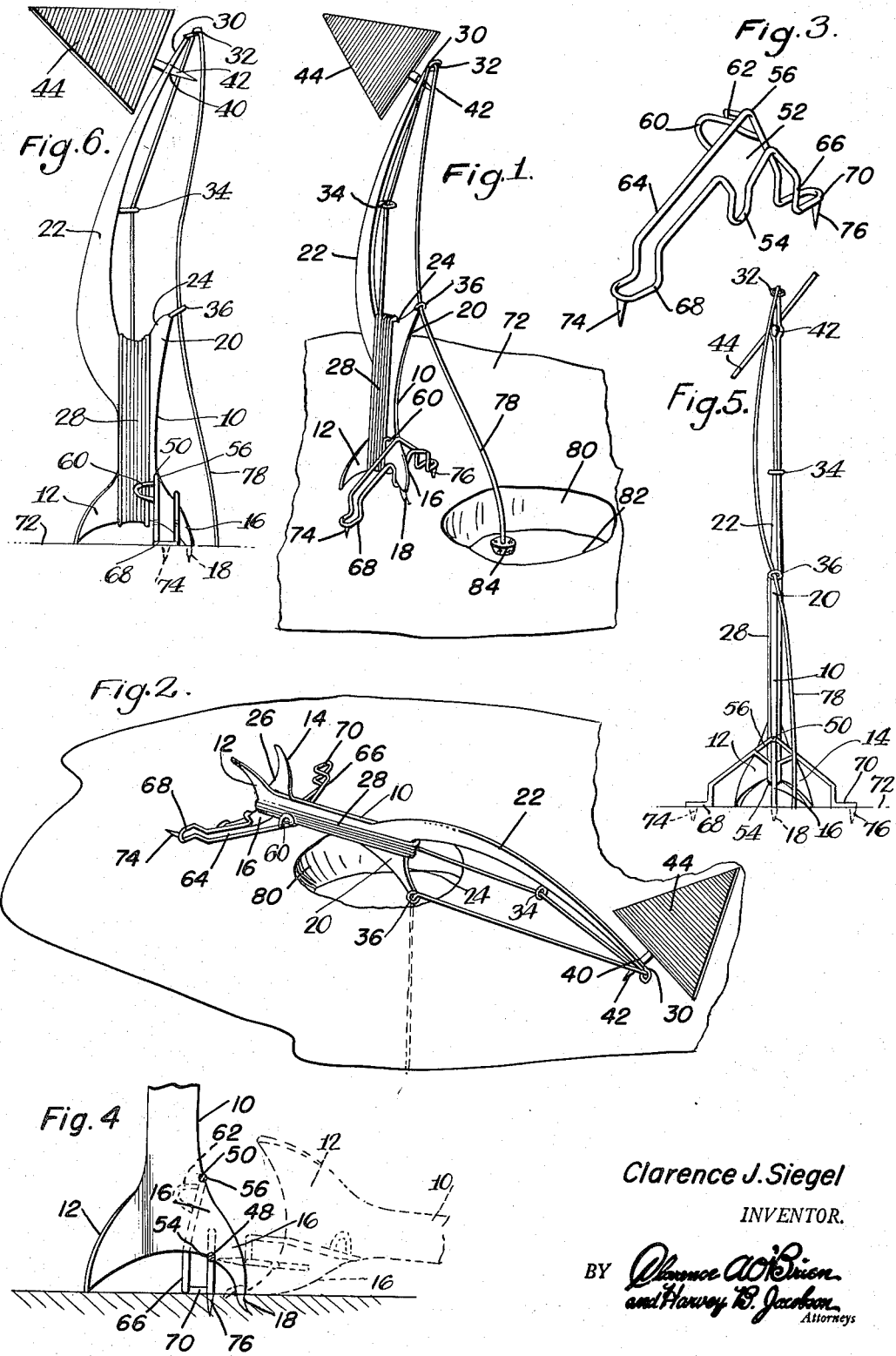
Clarence J. Siegel
INVENTOR.

ized Feb. 7, 1956

United States Patent Office

2,733,532
ICE FISH POLE AND TIP OVER

Clarence J. Siegel, Grand Rapids, Mich.

Application July 26, 1954, Serial No. 445,725

4 Claims. (Cl. 43—17)

This invention relates to an ice fish pole and tip over and particularly to a fish pole adapted to be positioned on the ice adjacent to an aperture therein and to be tipped across the aperture to apprise a fisherman of a bite.

In ice fishing it is customary to provide a relatively small aperture in the ice and to provide a stretcher called a tip up adjacent to the aperture and attach a fish line thereto so that when a fish bites on the line the tip up will be actuated to signal the fisherman that he has a bite. Such structures have heretofore been relatively inconvenient to set up or carry about so that a fisherman has a considerable burden to provide the necessary poles and tip ups therefor.

The present invention provides a combination fish pole and tip over device with means on said pole for storing the unused portions of the line thereon and having brace members to prevent lateral tipping of the pole together with means for securing the pole in tipped relation so that there will be no danger of the fish dragging the pole under the ice.

It is an object of the invention to provide an improved pole having novel means for establishing and normally maintaining an upright position of said pole on the ice.

It is a further object of the invention to provide a brace member for preventing lateral tipping of a fish pole set on the ice.

Other objects and many of the attendant advantages of the present invention will be apparent from the following detailed description taken in conjunction with the accompanying drawing, in which:

Figure 1 is a perspective view of the fish pole and tip over in operative position on the ice;

Figure 2 is a similar view of the tip over shown in tipped position;

Figure 3 is a perspective view of a brace member to be positioned on the pole to normally prevent lateral tipping thereof;

Figure 4 is an enlarged elevational view of the device in standing and in tripped relation to show the relation of the feet of the device and of the brace member therefor.

Figure 5 is a front elevation of the structure shown in Figure 1, that is, a view looking at Figure 1 in a direction from right to left; and Figure 6 is a side elevation of the same.

The preferred embodiment of the invention comprises a substantially elongated handle member 10 provided with three circumferentially spaced feet members 12, 14 and 16 providing a tripodal base for the lower end of the handle member 10. One of the feet, the foot 16, is provided with a depending ice engaging spur 18. A projection 20 is provided at the upper end of the handle member and extends outwardly and upwardly from said handle member substantially coplanar with the foot 16. A pole member 22 is integrally connected at one end with the handle member 10, is coplanar therewith, and is located substantially directly opposite from the projection 20 and extends upwardly and bows outwardly from the end of the handle member to provide a concave portion 24 to cooperate with the concave portion 26 shown in Fig. 2, provided by an outwardly and downwardly projecting foot such as the foot 14 so that a portion of the fishing line 28 may be readily reeled thereon.

The pole member 22 is substantially arcuate in formation and the tip portion 30 is substantially in spaced axial alignment with the handle member 10. A line guide 32 is placed adjacent the tip portion 30 and preferably a guide 34 will be provided intermediate the ends of the pole member 22. The usable portion of the line 28 will extend through the guide 32 and the intermediate guide 34 so that the line will not tangle. Preferably the projection 20 is provided with an auxiliary line guide 36 which will preferably be of the spiral type as shown in Fig. 2 so that the line 28 may be readily engaged therewith or disengaged therefrom. The pole member or portion 22 is provided adjacent the tip 30 with a transverse aperture 40 substantially aligned with the foot 16 and the projection 20. A spur member 42 extends in detachable relation through the aperture 40. A signal flag 44 of any desired type may be placed on the spur 42 and when the spur 42 is removed from the aperture 40 the signal flag will be thereby removed from the pole portion 22.

In order to prevent lateral upsetting of the pole when erected for use, a keeper notch 48 (Fig. 4) is provided in the underneath side of the foot 16 between the spur 18 and the base of the handle 10 and a second notch 50 is provided in the handle 10 in alignment with the foot 16. A detachable snap-on brace member is provided and has a clearance aperture 52 therein and a restricted stirrup-like portion 54 for engagement with the keeper notch 48 and a V-shaped bridle portion 56 the apical bend of which is adapted for engagement with the keeper notch 50. The material of said brace member is resilient so that it may be snapped into position on the foot 16 and remain there. In order to prevent lateral movement of the pole with respect to the brace member ears 60 and 62 are provided on opposite sides of the apical bend of the portion 56 and these serve to retain the brace in firm relation with respect to the handle member 10. The brace is provided with laterally extending arms 64 and 66 which are provided with suitable feet 68 and 70 which will contact the surface of the ice 72 at a material distance from the spur 18. Preferably the feet 68 and 70 are also provided with spurs 74 and 76 so that the brace may be firmly anchored in the ice to prevent lateral movement of the pole but sufficiently in line with the spur 18 that a pull on the portion 78 of the line 28 which extends through the aperture 80 into the exposed water 82 will cause the pole to tip and fall across the hole in the ice as shown in Fig. 2.

In operation the attachable brace member is snapped onto the foot 16 and the spurs 18, 74 and 76 are pressed into the ice so that the over-all device will stand in relatively upright position. The device will not be upset laterally by means of wind or other accidental pressure thereagainst. A portion of the line 28 is extended through the intermediate guide 34 and the tip guide 32 and will be connected to a suitable hook and bait and preferably will be provided with a bobber 84.

The brace member functions to increase the width of the multiple foot or tripodal supporting base at the lower end portion of the handle member 10 so that there is greater likelihood for the pole member, including the handle member, to tip over in a plane which includes the projection 20 and the foot 16 than in any other direction. By placing the line 78 in that plane, the over-all device is made to tip in the direction of the hole 80. By sizing the hole 80 properly, and positioning the upstanding pole member in respect thereto, it is possible not only to position the line guide 36 so that it will be directly over the hole 80, but also by virtue of the anti-skidding spur 18 the device will tend to remain erect in the intended position for fishing shown in the drawings.

It is also apparent that the brace member may be readily removed from the foot 16 and the line portion 78 disengaged from the spiral guide 36 and the device then used as a substantially conventional-type fishing pole.

What is claimed as new is as follows:

1. An ice fish pole comprising a handle member having a line storing portion, a plurality of feet carried by and extending beyond one end of said handle member, an ice engaging spur on one of said feet, a pole portion joined to and extending longitudinally beyond the other end of said handle member, a line guide on said handle member, said line guide being laterally spaced from said pole portion, said spur-carrying foot having a keeper notch in one face, said handle member having a complemental keeper notch aligned with said spur-carrying foot, a resilient brace member having portions releasably engaged in said keeper notches, said brace member extending transversely of said spur carrying foot.

2. An ice fish pole of the tip over type comprising a handle portion, at least two outwardly extending feet at one end of said handle portion, an ice engaging and anchoring spur fixed on one of said feet, an outstanding curved projection on the opposite end of said handle portion, said projection being in alignment with said spur carrying foot, a pole portion joined with and projecting from said handle portion on the side thereof opposite to said projection, a tip on said pole portion, said pole portion being curved whereby said tip is substantially in vertical alignment with the longitudinal axis of said handle portion, a line guide mounted on said tip, a second line guide mounted on said projection, said pole portion having a transverse aperture arranged substantially in alignment with said spur carrying foot and said projection, and a second ice engaging spur detachably mounted in said aperture, said first named spur serving to permit said handle portion and pole portion, as an entity to be vertically erected and anchored on the ice so that the projection, line guide thereon and said ice engaging spur will be located and held directly over the hole in the ice.

3. The structure defined in claim 2 and the combination therewith of a complemental signal flag fixedly mounted on and constituting a part of said detachable ice engaging spur.

4. The structure defined in claim 3 and the combination therewith of a readily attachable and detachable stand-like brace member detachably mounted on said spur-carrying foot, said brace member constituting a stabilizer and cooperating with said feet and increasing the ability of the feet in supporting the over-all device so that there is a greater likelihood of the latter to tip over in a plane which includes the projection and said spur carrying foot than in any other direction.

References Cited in the file of this patent

UNITED STATES PATENTS

| | | |
|---|---|---|
| 1,204,856 | From | Nov. 14, 1916 |
| 2,045,063 | Baranowski | June 23, 1936 |
| 2,487,094 | Brown | Nov. 8, 1949 |
| 2,496,090 | Grohs | Jan. 31, 1950 |
| 2,550,791 | English | May 1, 1951 |
| 2,554,927 | Schultz, Jr. | May 29, 1951 |
| 2,650,052 | Bintz | Aug. 25, 1953 |
| 2,663,962 | King | Dec. 29, 1953 |